April 24, 1928.

W. L. CALDWELL

ORDER BLANK

Filed Feb. 21, 1927

1,667,622

Patented Apr. 24, 1928.

1,667,622

UNITED STATES PATENT OFFICE.

WILLIAM LYON CALDWELL, OF INDIANAPOLIS, INDIANA.

ORDER BLANK.

Application filed February 21, 1927. Serial No. 170,009.

The invention relates to a new and improved order blank, intended primarily for use by dairies and their customers, to permit the customers to inform the deliverymen as to the produce and quantity wished each day.

It is the principal object of the invention to provide an order blank on which the customer may indicate the produce and quantity desired, simply by proper positioning of a clip or a plurality of such clips upon a card. This card bears printed matter spaced along an edge and denoting various products and quantities thereof, and hence, by properly placing a clip or clips and positioning the card at a point accessible to the deliveryman, the customer may make her needs known. Preferably, a clamp is provided for engagement with an empty milk bottle, to hold the order blank in readiness for attention by the deliveryman but since the construction of this clamp forms no part of the present invention, it is omitted from this application.

It is a further object of the invention, to make novel provision for holding the clips against sliding out of place, and at the same time providing means which may be read by touch, if delivery is made during darkness.

Yet another aim of the invention is to provide for combining an account record with the order blank, permitting easy keeping of the account by the deliveryman and allowing the customer to check the produce delivered on any order with the charge or charges entered on the card, for such produce.

The preferred form of the invention is shown in the accompanying drawing, showing the card somewhat in perspective, with a plurality of the clips engaged therewith.

On the drawing, the numeral 1 designates a card formed from any desired material, although cardboard, preferably waterproofed, is probably most advantageous. Along one edge 2 of this card, are two rows of printed matter, said rows being identified by the numerals 3 and 4 respectively. The row 3 contains the names of products to be ordered, such as milk, nursery milk, cream, whipping cream, buttermilk, etc. The row 4 contains quantity symbols printed opposite the produce names. For instance, opposite the word milk in the row 3, the symbols for one pint, one quart, two quarts and three quarts appear. Similarly, the quantity designations or symbols "jar" and "one doz." appear opposite the names "Cheese" and "Eggs".

With the card 1, I provide a plurality of clips 5, which may well be ordinary paper clips. When these clips are not in use, they may well be engaged with the edge 6 of the card 1, and this card may be provided with printed matter 7 adjacent said edge 6, giving the use of these clips to the customer. By removing one or more of the clips 5 from the edge 6 and engaging them with the edge 2, at the proper locations, the customer may make her needs known in a manner which cannot be misunderstood. For instance, if the customer wishes one quart of milk and one pint of cream, two of the clips 5 will be engaged with the edge 2, at the positions shown in the drawing.

The edge 2 of the card 1 is preferably formed with longitudinally spaced notches 7, disposed opposite the quantity symbols of the row 4, and the clips 5 embody portions 8 receivable in these notches, so that the clips cannot be accidentally slid along the card, after they are once properly positioned. To further aid in preventing such accidental sliding of the clips, the opposed edges 9 of each notch, are preferably undercut or disposed in inwardly diverging relation.

In addition to holding the clips 5 against accidental slippage, the notches 7 permit the deliveryman to read an order by touch, if delivery is made in darkness. He becomes so familiar with the card, that when he feels a clip in the second notch from the top, he knows that one quart of milk is desired, if the clip is in the third notch, he knows that two quarts of milk are wanted, etc.

In addition to the subject matter above described, the card 1 preferably displays printed matter 10 providing for an account record. This printed matter provides spaces 11 for all days of the month, in which the costs of the produce are entered by the deliveryman, opposite the date on which the delivery is made. The matter 10 also embodies spaces 12 in which the amount due the company for any day's delivery is totaled, and other spaces 13 are provided in which the deliveryman makes entries of any payments made by the customer. The spaces 14 are to be filled with the initials of the drivers making the collections. A space 15 is preferably provided at the top of the printed matter 10 to receive any balance carried forward from the previous card. Similarly, another space 16 is provided at the lower end of the printed matter 10, to be occupied by any amount which is to be carried forward to the next card.

In addition to the subject matter so far described, the card 1 preferably bears lines 17 upon which to write the customer's name and address, displays a note 18 to the customer, and still possesses ample space 19 for advertising or other purposes.

As excellent results are obtainable from the details disclosed, they are preferably followed. However, within the scope of the invention as claimed, variations may be made.

I claim:—

An order blank for products intended to be placed at a point accessible to a deliveryman; said blank comprising a card having printed matter spaced along an edge denoting various products and quantities thereof, said edge having notches at the quantity designations, and clips adapted to frictionally straddle said edge of card at designations showing the product and quantity wanted, said clips having portions for reception in said notches, whereby the clips are held against accidental sliding out of place, said notches having their opposed edges disposed in inwardly diverging relation to more effectively hold the clips against accidental slippage and also permitting the deliveryman to read the order by touch if delivering in darkness.

In testimony whereof I have hereunto affixed my signature.

WILLIAM LYON CALDWELL